United States Patent
Ptasinski et al.

(10) Patent No.: US 10,571,632 B2
(45) Date of Patent: Feb. 25, 2020

(54) OPTICAL WAVEGUIDE

(71) Applicants: Joanna N. Ptasinski, San Diego, CA (US); Stephen D. Russell, San Diego, CA (US)

(72) Inventors: Joanna N. Ptasinski, San Diego, CA (US); Stephen D. Russell, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 16/034,524

(22) Filed: Jul. 13, 2018

(65) Prior Publication Data

US 2020/0018900 A1  Jan. 16, 2020

(51) Int. Cl.
*G02B 6/132* (2006.01)
*G02B 6/136* (2006.01)
*G02B 6/12* (2006.01)

(52) U.S. Cl.
CPC ............. *G02B 6/132* (2013.01); *G02B 6/136* (2013.01); *G02B 2006/12061* (2013.01); *G02B 2006/12097* (2013.01)

(58) Field of Classification Search
CPC ................................ G02B 6/132; G02B 6/136
See application file for complete search history.

(56) References Cited

U.S. PATENT DOCUMENTS

| | | | |
|---|---|---|---|
| 6,506,289 B2 * | 1/2003 | Demaray | C23C 14/345 204/192.12 |
| 7,469,558 B2 * | 12/2008 | Demaray | B29D 11/00663 65/386 |
| 9,329,203 B1 | 5/2016 | Ptasinski et al. | |
| 2014/0360578 A1 * | 12/2014 | Nichol | H01L 31/054 136/259 |

OTHER PUBLICATIONS

Iacona, F. et al., "Structural Properties of SiO2 films Prepared by Plasma Enhanced Chemical Vapor Deposition," Materials Science in Semiconductor Processing 4, pp. 43-46 (2001).

(Continued)

*Primary Examiner* — Sung H Pak
*Assistant Examiner* — Hoang Q Tran
(74) *Attorney, Agent, or Firm* — Naval Information Warfare Center, Pacific; Kyle Eppele; Arthur K. Samora

(57) ABSTRACT

A waveguide and methods for manufacture can include a silicon wafer and a silicon substrate on the wafer that can be patterned into a silicon waveguide. A cladding can be deposited on the wafer and that waveguide using a plasma enhanced chemical vapor deposition (PECVD) process. When a PECVD process is used, the cladding portions that are in contact with that waveguide and in the immediate vicinity can have a lower density, and a lower refractive index n of less than (n<1.3). The lower uniform cladding refractive index can be uniform from the waveguide surfaces out to approximately one micrometer from the waveguide. This can further in result in an increased difference between the refractive index of the silicon waveguide and the adja- (Continued)

cent lower refractive index cladding portions, which can further result in greater light confinement within the waveguide (i.e. reduced losses during transmission).

20 Claims, 7 Drawing Sheets

(56) References Cited

OTHER PUBLICATIONS

Rzodldewicz, W. et al., "Determination of the Analytical Relationship Between Refractive Index and Density of SiO2 Layers," Proceedings of the III National Conference on Nanotechnology NANO 2009, Acta Physica Polonica A, 116, pp. S92-S94 (2009).
Schubert, E. F. et al., Low-Refractive-Index Materials: A New Class of Optical Thin-Film Materials, Physica Status Solidi B, 244(8), pp. 3002-3008 (2007).
Schubert, E. F. et al. "Low-Refractive-Index Materials—A New Class of Optical Thin-Film Materials," CLEO Conference (2009).

* cited by examiner

OPTICAL WAVEGUIDE

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103674.

FIELD OF THE INVENTION

This invention pertains generally to waveguides. More specifically, the invention pertains to optical waveguides, which can be made of low refractive-index materials for photonic and/or electronic applications. The invention is particularly, but not exclusively, useful as an optical silicon waveguide that can be surrounded by lower density silicon dioxide material in a manner which can allow for greater light confinement within the waveguide, which can result in more efficient transmission of light through the waveguide.

BACKGROUND OF THE INVENTION

Silicon photonics can allow for high density component integration on a single chip and it can bring promise for low-loss, high-bandwidth data processing in modern computing systems. The technology, when combined with wavelength division multiplexing (WDM) systems, can portend a future generation of 100+ Gbit/s networks, particularly in terms of making them more cost effective than 10 Gbit/s and 40 Gbit/s nets. WDM can enable multiple channel data transmission in a single fiber-optic link and can dramatically increase the aggregate data rate.

Optical waveguides are known in the prior art for use in these photonics applications. Often times, optical waveguides can have a protective cladding. This can be particularly true when extremely small waveguides are patterned on silicon chips. For efficient light transmission through the waveguide, it can be desirable to maximize light confinement within the waveguide during transmission. To maximize light confinement, it can be desirable for the difference between the cladding refractive index and the waveguide refractive index to be as great as possible. Thus, it can be desirable to have an optical film, or cladding material (in the specification, cladding can be taken to mean the act or process of bonding one film or substrate to another, or to mean the film or substrate used to accomplish the bonding process, but where the film materials are not necessarily metallic) with as low a refractive index as possible. Currently there are very few optical thin films that possess low refractive indices, and optical materials with indices between about n=1.1 to about n=1.20 do not exist.

Silicon dioxide ($SiO_2$) is a commonly used material with applications in photonics and microelectronics. It can be used in optical fibers due to its low absorption of light and by virtue of its excellent electrical insulation properties, and it can function to protect silicon, block current and store charge in electrical applications. In silicon photonics, $SiO_2$ is typically used as the cladding material surrounding a silicon waveguide core. Typical methods of $SiO_2$ deposition can include chemical vapor deposition (CVD) processes such as low pressure (LPCVD), plasma enhanced (PECVD), microwave plasma (MPCVD), or thermal oxidation. One of the key advantages of silicon photonics lies in leveraging standard CMOS manufacturing equipment and using these typical CVD processes to enable high volume production, in addition to the feasibility of monolithically integrating most of the electronic-photonic components on a single chip. This can significantly reduce assembly processes, which can drastically reduce component sizes.

Of the CVD methods mentioned above, PECVD systems have entrenched their place in the electronics sector because of their flexibility in depositing many thin films such as silicon nitride ($Si_3N_4$), silicon monoxide (SiO), silicon dioxide ($SiO_2$), silicon oxinitride (SiON), diamond-like carbon (DLC), amorphous-silicon (a-Si) and polycrystalline-silicon (poly-Si) for integrated circuit applications. Also, the PECVD process can be accomplished at much lower temperatures than other CVD processes. However, the PECVD process can lead to less dense films, and PECVD oxides produced at lower temperatures can be significantly more porous than those deposited at higher temperatures. For silicon photonic applications, these PECD "disadvantages", combined with less than optimal step coverage and inhomogeneous coverage of 3D nanostructures, can result in areas of lower density $SiO_2$ in the vicinity of silicon strip waveguides. In the past, this effect has been viewed as sub-optimal and consequently this material non-uniformity has been overlooked thus far in the Si nanophotonics community. If a "uniform non-uniformity" resulting from the more convenient PECVD processes could be achieved, at least in the areas in contact with and immediately adjacent the waveguide, an extremely low refractive index film can be accomplished.

Such extremely low refractive index materials could find use in distributed Bragg reflectors, which are periodic structures that can consist of an alternating series of a quarter-wavelength thick high-index and low index material with a refractive index of $n_{high}$ and $n_{low}$. Low index materials could also find use in other periodic structures, such as photonic crystals, plasmonic arrays or metamaterials, as well as in microelectronic applications for electrical isolation as a gate oxide, sidewall spacer or field oxide. They may also be useful as an etch stop or sacrificial layer in micro-mechanical fabrication. Still further, the materials could also be used in light emitting devices for electrical isolation or graded index (GRIN) antireflective coatings, as the figure of merit of these structures depends on the refractive index contrast (or difference) between the layers. Low index claddings could be used for optical fibers and other optical waveguides (i.e. chip scale). Currently, silicon dioxide (n=1.46) and magnesium fluoride (n=1.39) are commonly used. Other potential application areas can consist of filters, band-passes, lasers, LEDs, and solar cells.

In view of the above, it can be an object of the present invention to provide an optical waveguide and method of manufacture in accordance with several embodiments that can achieve better light confinement within the waveguide. Another object of the present invention can be to provide an optical waveguide and method of manufacture with a cladding having a greatly reduced refractive index. Still another object of the present invention can be to provide an optical waveguide and a method of manufacture that can be manufactured at a reduced temperature using a PECVD process. Yet another object of the present invention can be to provide an optical waveguide and method of manufacture that can have an increased difference between the waveguide and cladding material refractive indices. Still another object of the present invention can be to provide an optical waveguide that can be manufactured and deployed in a relatively efficient, cost-effective manner.

SUMMARY OF THE INVENTION

A waveguide and methods for manufacture can include a silicon wafer and a silicon substrate on the wafer that can be patterned into a silicon patterned waveguide. A cladding can be deposited on the wafer and the patterned waveguide using a plasma enhanced chemical vapor deposition (PECVD) process. When a PECVD process is accomplished in a certain manner, the cladding portions that are in contact with the patterned waveguide and in the immediate vicinity can have a lower density (within 1 μm of the patterned waveguide) and a uniform refractive index n of less than 1.3 (n<1.3). These lower density portions of the cladding can have this refractive index, and the cladding refractive index can be uniform, from the waveguide surface out to approximately one micrometer from the waveguide in a direction normal to the waveguide surface. This can further result in an increased difference between the refractive index of the silicon waveguide and the adjacent cladding portions, which can further result in greater light confinement within the waveguide (i.e. reduced losses during light transmission through the waveguide).

For the present invention, the wafer can be made of a material selected from the group consisting of silicon, silicon on insulator (SOI), or silicon on sapphire (SOS). The waveguide can be patterned using electron beam (e-beam) resist or photoresist. The PECVD process for some embodiments of the invention can result in a cladding having a thickness of about 1800 nanometers, when the wafer thickness is 680 micrometers and the waveguide thickness (thicknesses are when the optical waveguide is viewed in cross section) of about 250 nanometers. Although the cladding density and refractive index is non-uniform when considered over the entire wafer, the cladding can have uniform, lower density portion up to a distance of about one micrometer (1 μm) in a direction normal to the waveguide surfaces. The uniform lower density portions can be independent of the waveguide width.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF EMBODIMENTS

Figure 1A:
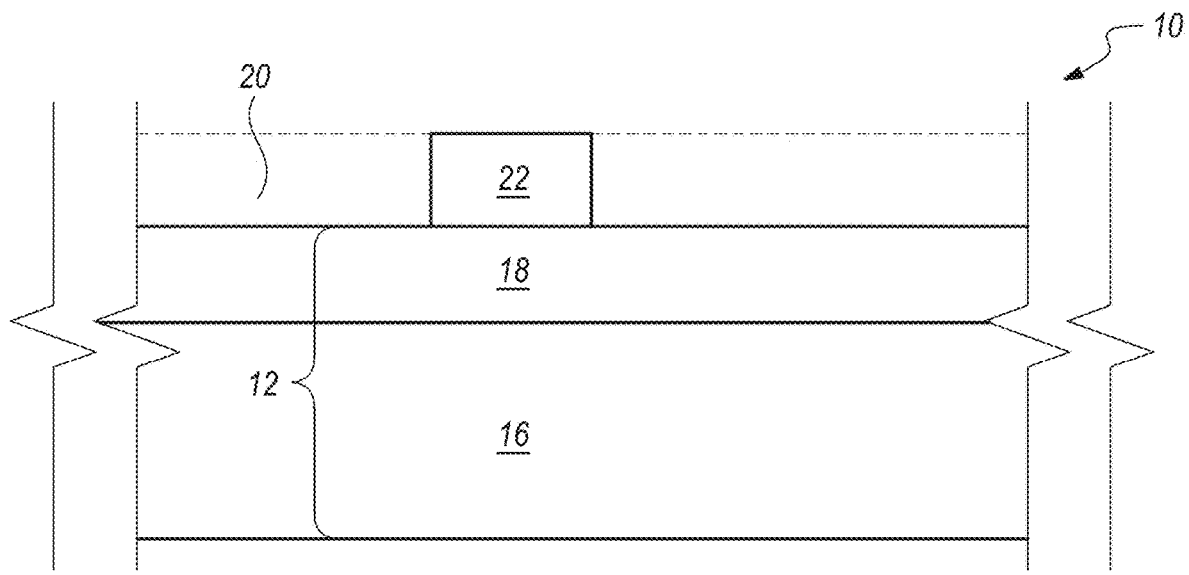
FIG. 1A can be a cross-sectional view of the optical waveguide of the present invention according to several embodiments, prior to the cladding being deposited.
Figure 1B:
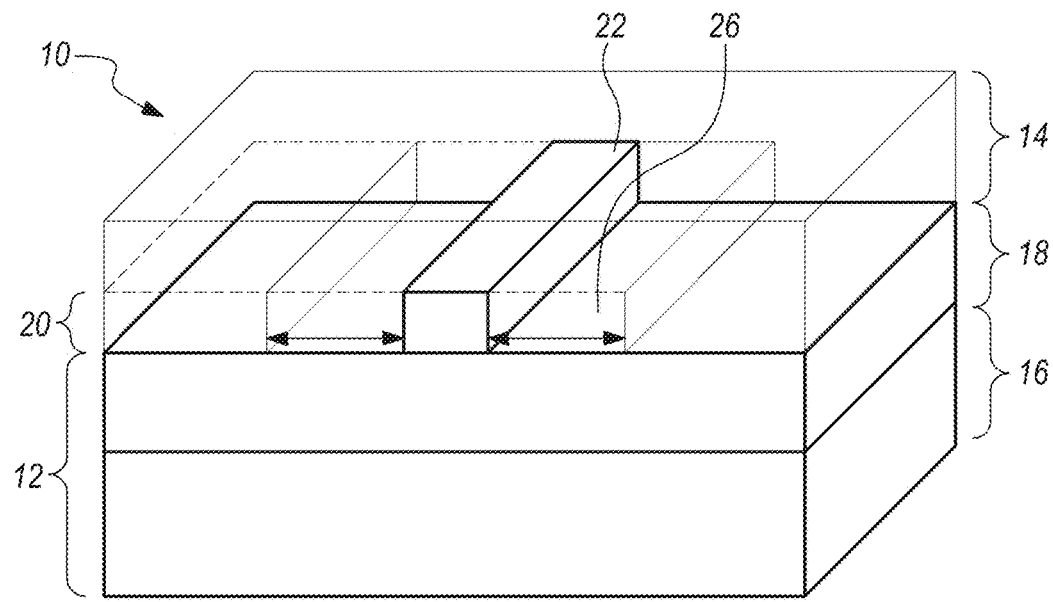
FIG. 1B can be the same view as FIG. 1A, with the cladding deposited on the patterned waveguide.

Referring initially to FIGS. 1A and 1B, a waveguide according to several embodiments of the present invention can be shown and can be generally designated using reference character 10. As shown, waveguide 10 can include a silicon wafer 12 and a waveguide cladding 14 than can be deposited on the wafer 12 as described more fully below. Wafer 12 can be made of a silicon, silicon on insulator (SOI), or silicon on sapphire (SOS) material, or other materials as known in the prior art. For the embodiments shown in FIGS. 1A-1B, wafer 12 can be an SOI wafer that can be 680 μm thick, and that can be composed of a silicon handle layer 16 and a 3 μm buried oxide (BOX) layer 18 and a waveguide substrate 20 (The thicknesses in FIGS. 1A and 1B are not to scale). Waveguide substrate 20 can be 250 nm of silicon placed on top of BOX layer 18.

Before cladding 14 is deposited (FIG. 1B), waveguide substrate 20 can be patterned to result in patterned waveguide 22. Either electron-beam (e-beam) resist lithography or photoresist etching could be used to pattern substrate 20. Other patterning methods could also be used. When e-beam resist is used, Flowable Oxide (FOX®-16) e-beam resist from DOW CORNING® can be diluted in Methyl Isobutyl Ketone (MIBK), one part FOX®-16 to two parts MIBK (by weight), and spun at 4000 rpm resulting in a 180 nm thick coat. A hot plate bake step at 175° C. for 4 minutes can aid in removing excess FOX®-16/MIBK solvent. Next, the waveguide substrate 20 can patterned with an e-beam lithography system. For instance, an EBPG 5200 electron beam lithography system manufactured by VISTEC® could be used, using a dosage of 5,120 μC/cm², and developed in Tetramethylammonium hydroxide (TMAH) for 1 minute.

Next, a dry etch of silicon substrate 20 can be performed, using, for example, an Oxford PLASMALAB® 100 reactive ion etching/inductively coupled plasma (RIE/ICP) machine from Plasma Technology, LTD., United Kingdom with a mixture of 25 standard cubic centimeters per minute (sccm) of $SF_6$ and 50 sccm of $C_4F_8$ at a temperature of 15° C., and with a RIE power of 30 W and ICP power of 1200 W. Other devices and methods could certainly be used to perform the dry etching. The result can be patterned waveguide 22.

It should be appreciated that if photolithography is accomplished instead of electron beam lithography to pattern the patterned waveguide 22, then the wafer 12 can be exposed in an appropriate photolithography system with different components and operating parameters and steps than those described above. Other patterning systems could also be used, provided the end result of such patterning systems is a patterned waveguide 22 having a predetermined pattern, as desired by the user.

Once the patterned waveguide 22 has been formed as described above, the systems and methods according to several embodiments can include depositing a cladding 14 over patterned waveguide 22 and wafer 12. For example, and as depicted in FIGS. 1A-1B, a 1800 nm layer of $SiO_2$ cladding 14 can be deposited via plasma-enhanced chemical vapor deposition (PECVD). To deposit a cladding of this material at this thickness, the PECVD system can be brought up to and held at 350° C. Deposition can be done using a mixture of 5% $SiH_4$ and 95% $N_2$ at 117 sccm with 710 sccm of $N_2O$ at a deposition rate of 72 nm/minute. The PECVD chamber pressure can be 1000 mT and the RF power can be 20 W at 13.56 MHz.

One device that can be used for performing this step can be a PLASMALAB® 80Plus system manufactured by Oxford Instruments Nanotechnology Tools, Ltd, of Abingdon, United Kingdom. Other PECVD systems can be used. The system is brought up to and held at 350° C. Deposition is done using a mixture of 5% $SiH_4$ and 95% $N_2$ at 117 sccm with 710 sccm of $N_2O$ at a deposition rate of 72 nm/minute. The PECVD chamber pressure is 1000 mT and the RF power is 20 W at 13.56 MHz.

Figure 2A:
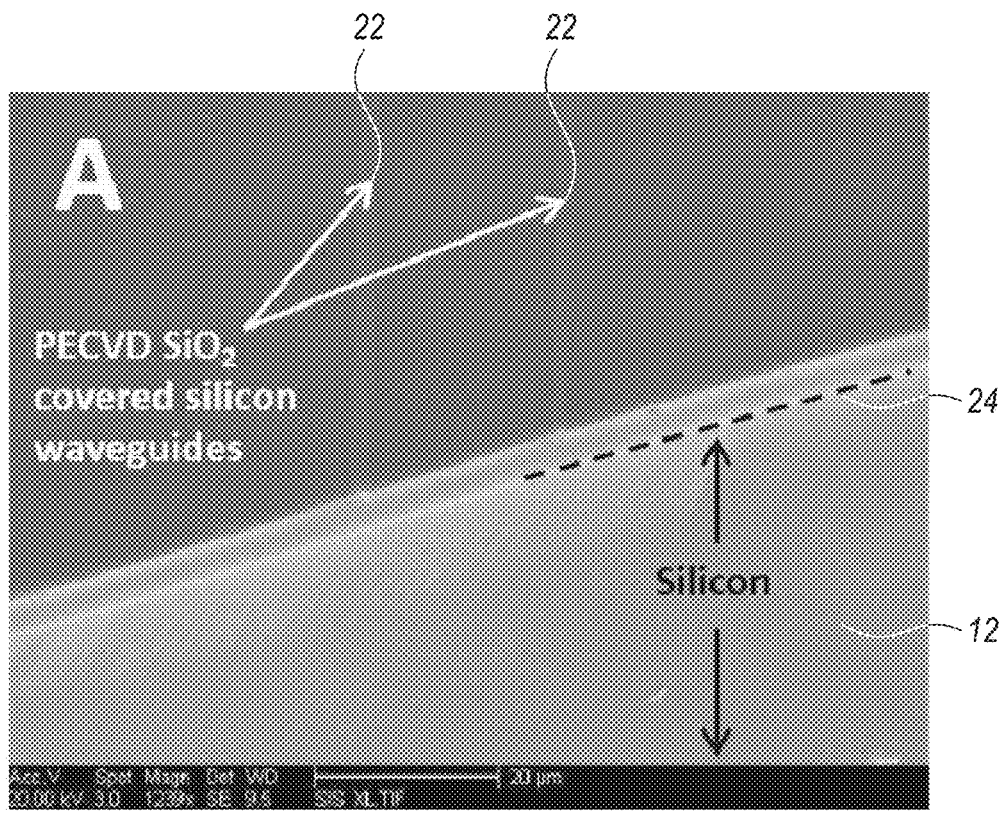
FIG. 2A can be a scanning electron microscope (SEM) image of the waveguide of FIG. 1B taken at a 45-degree angle to the waveguide.
Figure 2B:
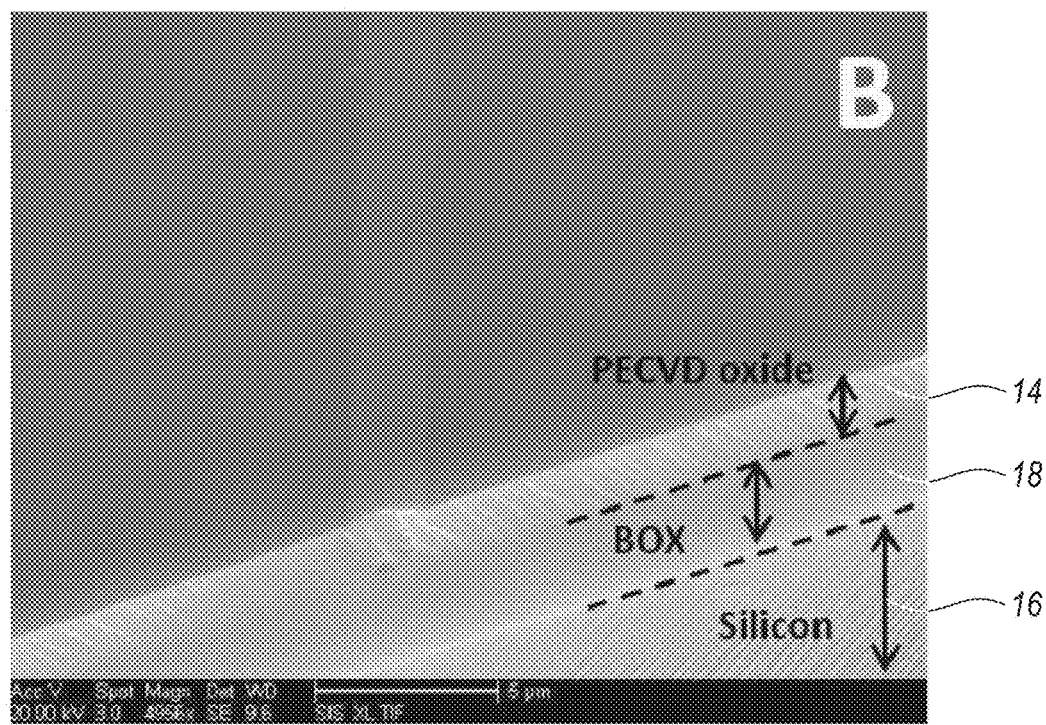
FIG. 2B can be a larger scale (zoomed in) SEM image of a portion of FIG. 2A.
Figure 2C:
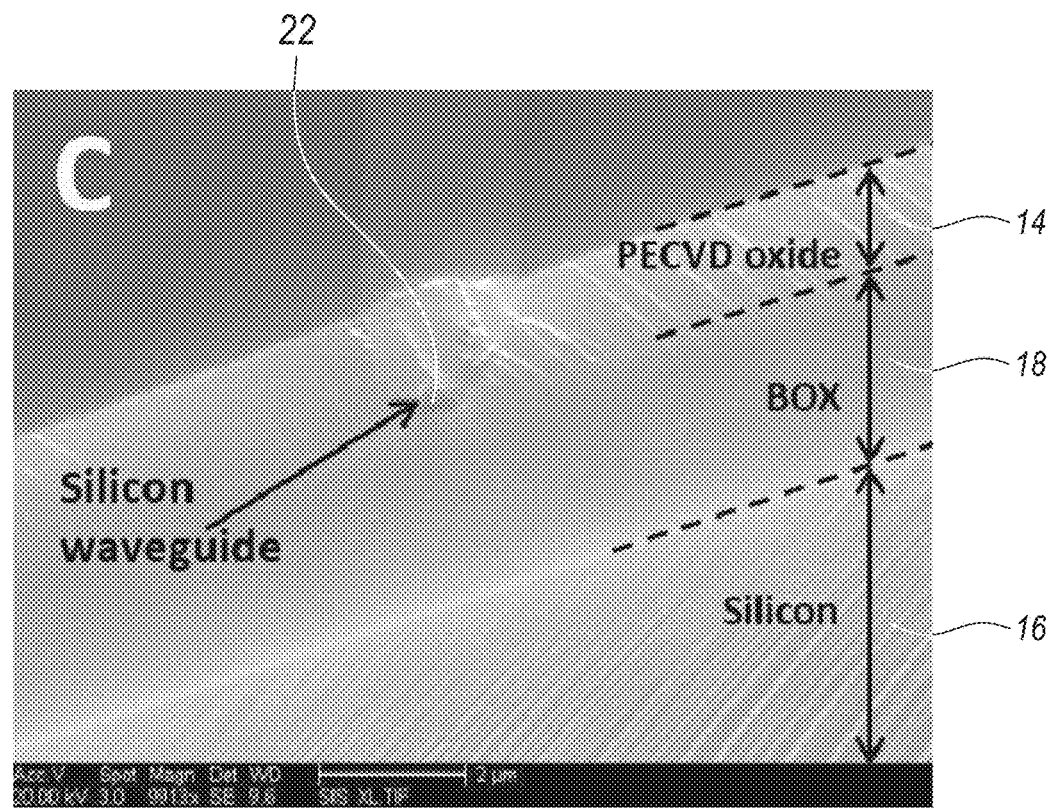
FIG. 2C can be a still larger scale (zoomed in) SEM image of a portion of FIG. 2B.
Figure 2D:
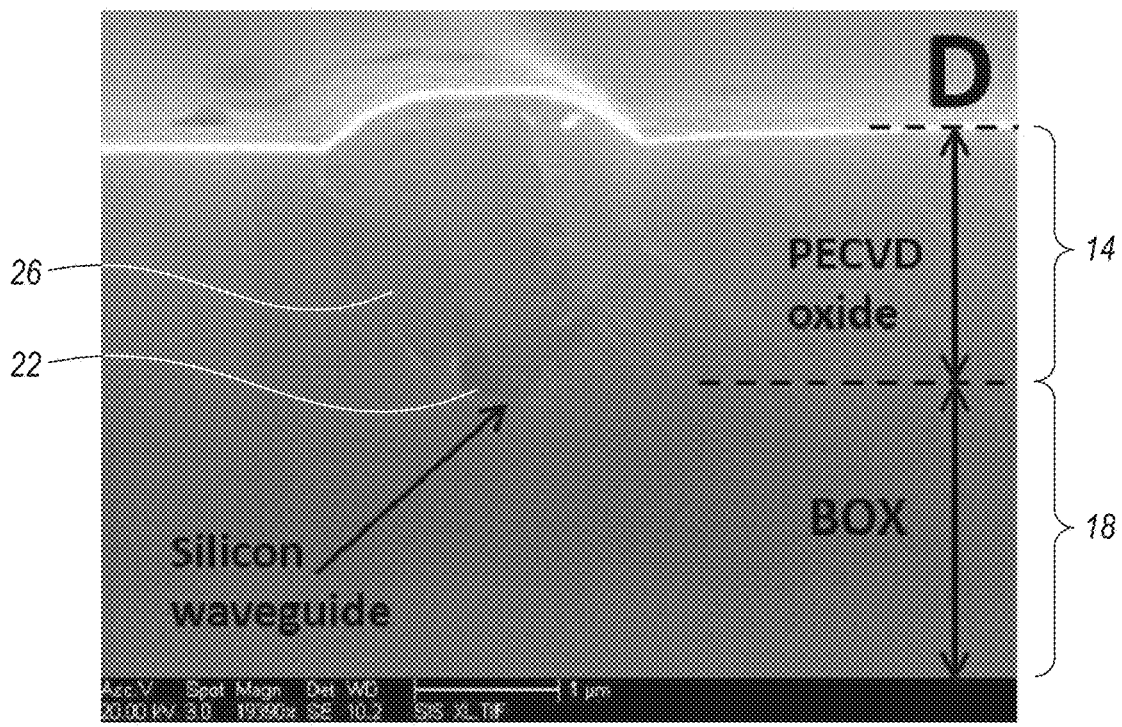
FIG. 2D can be a close up SEM image of the silicon waveguide of FIG. 2C.

Referring now to FIGS. 2A-2E, the optical waveguide 10 of the present invention of several embodiments can be shown in greater detail. More specifically, FIGS. 2A-2E can be scanning electron microscope (SEM) images of PECVD $SiO_2$ covered silicon waveguides that have been manufactured using the steps described above. The waveguide can be composed of a Si handle, 3 μm of a buried oxide layer, silicon (already patterned) and PECVD $SiO_2$. FIG. 2A can depict two silicon patterned waveguides at the edge of the wafer 12. The black dotted line represents a demarcation point between the silicon handle and oxide layers. FIG. 2B can be a more zoomed-in image of the waveguide appearing on the left hand side of FIG. 2A. In FIG. 2B, a clear difference between the two $SiO_2$ layers (the BOX layer 18 and the cladding 14) can be seen. FIG. 2C can contain the image appearing in FIG. 2B, magnified even more. The silicon waveguide is now clearly visible. FIG. 2D can be a close up of the silicon patterned waveguide 22 surrounded by BOX layer 18 and PECVD $SiO_2$ cladding 14.

Figure 2E:
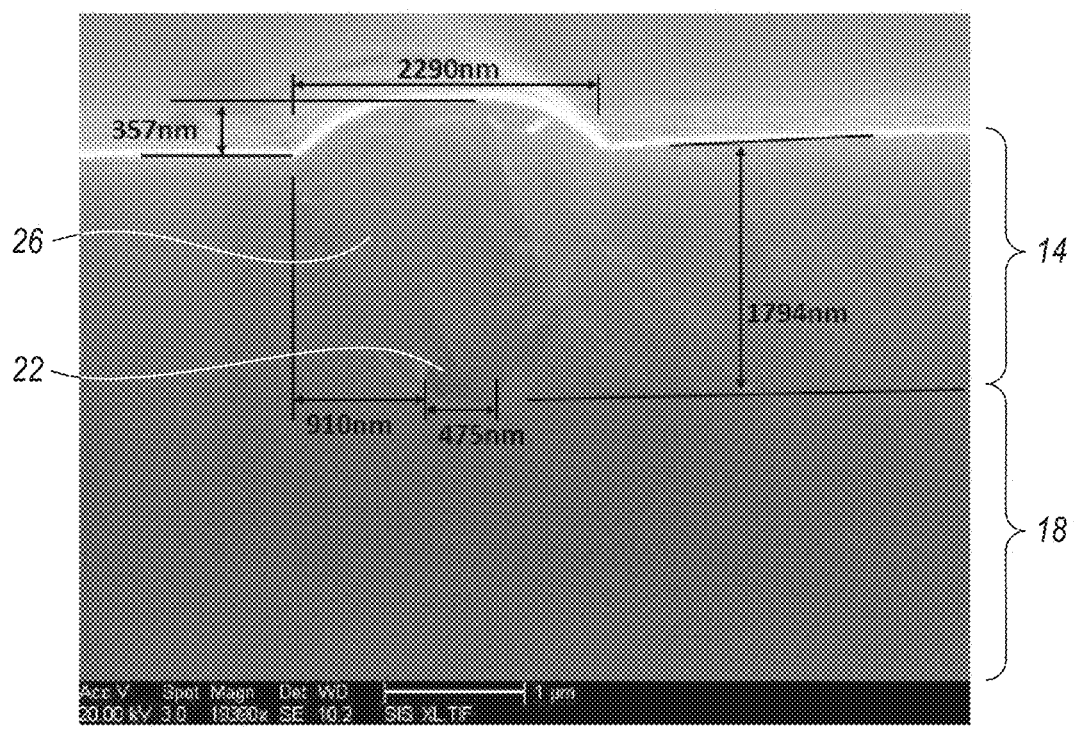
FIG. 2E can be the same SEM image of FIG. 2D but with components of the optical waveguide of FIG. 1 labeled with dimensions to demonstrate areas of lower density cladding immediately around the patterned waveguide structure of the waveguide of FIG. 1B.

FIG. 2E can depict an unetched patterned waveguide 22 that has been covered in $SiO_2$ cladding 14 using PECVD. The sample was cleaved in order to obtain this image. The Si waveguide width can be 475 nm and the PECVD $SiO_2$ cladding 14 layer can be 1794 nm thick. A bulge of PECVD $SiO_2$ can be formed directly over the Si waveguide. This bulge can be 2290 nm wide and it can rise to 375 nm above the rest of the PECVD $SiO_2$ film, and this protuberance can extend out to 910 nm (~1 μm) in a direction away from and normal to the surface of the Si strip. The image does not show visible air gaps in the vicinity of the Si waveguide, suggesting that lower density portion 26 of the $SiO_2$ cladding 14 can be responsible for this effect. The lower density $SiO_2$ regions are also not visible in this image, likely due to a low refractive index contrast between the lower density $SiO_2$ and the higher density PECVD $SiO_2$ region.

Referring now to FIGS. 3A-3D, top plan SEM images of several patterned waveguides 22 that were made using the methods according to several embodiments are illustrated. From FIGS. 3A-3D, it can be seen that: (1) The width of the lower density portions 26 can extend out about 1 μm from each edge of a Si patterned waveguide; (2) The wide of the lower density portion 26 area does not depend on the width of the Si patterned waveguide 22; and, (3) Unetched silicon dioxide can form a narrow ridge when two patterned waveguides 22 are approximately 2 μm apart. FIGS. 3A-3D can present SEM images of several silicon structures following the wet etch step. Typically, the HF etch rate can be a good measure of the film's density. It can be seen that only the regions immediately surrounding the silicon shapes show fully etched $SiO_2$ and these regions extend ~1 μm from the outer boundary of the patterned waveguide 22. The numbers in the figure denote particular regions and aid in identifying their measured width values. From the figure, it can be deduced that the present invention according to several embodiments is not geometry dependent and that it manifests itself regardless of the silicon structure shape.

Figure 3A:
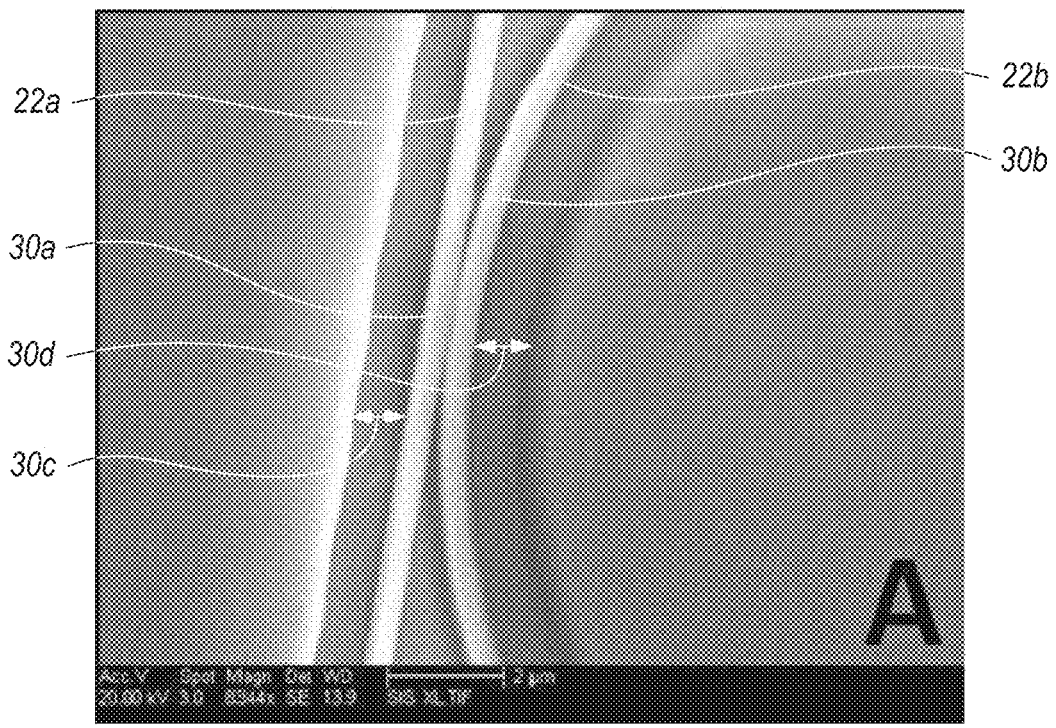
FIG. 3A can be a scanning electron microscope (SEM) image in top plan, which can show the patterned waveguide and the lower density portion of the cladding.
Figure 3B:
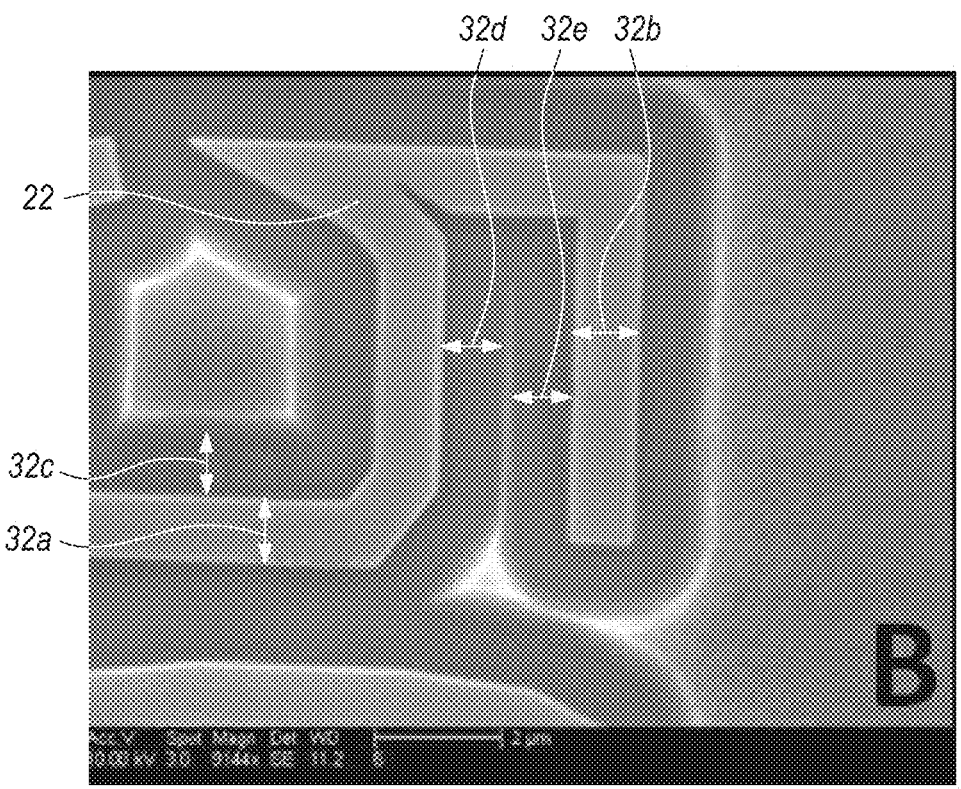
FIG. 3B is the same image as FIG. 3A, but with a patterned waveguide having a shape similar to the numeral "5" when viewed in top plan.

In FIG. 3A, FIG. 3A can be a coupling section between two patterned waveguides 22, patterned waveguide 22b can have a ring resonator geometry and patterned waveguide 22a can have straight bus shape when viewed in top plan. Arrow 30a can point to a straight silicon waveguide 22a with a measured width of 470 nm, arrow 30b can mark a patterned waveguide 22b ring structure of 475 nm width. The gap between a silicon waveguide and under etched $SiO_2$ can be 910 nm wide and can be denoted by arrow 30c. Arrow 30d can shows a 912 nm gap between a patterned waveguide ring 22b and under etched $SiO_2$. In FIG. 3B, a patterned waveguide 22 can be shown having, for example, the form of the numeral "5" when viewed in top plan. Arrows 32a and 32b can depict the silicon strip widths, which are 947 nm and 925 nm, respectively. Arrows 32c, 32d and 32e can denote the gap widths between the Si structure (patterned waveguide 22) and under etched $SiO_2$. The gap of arrow 32c, between a Si patterned waveguide and an under etched island of $SiO_2$ can be 862 nm wide. Arrow 32d can point to a 968 nm gap, and the gap tagged by arrow 32e can be 964 nm wide. It can be expected that the gaps denoted by arrow 32d and 32e would be of similar width, since the under etched $SiO_2$ pin-shape appearing between them is precisely in the middle between the two silicon strips.

Figure 3C:
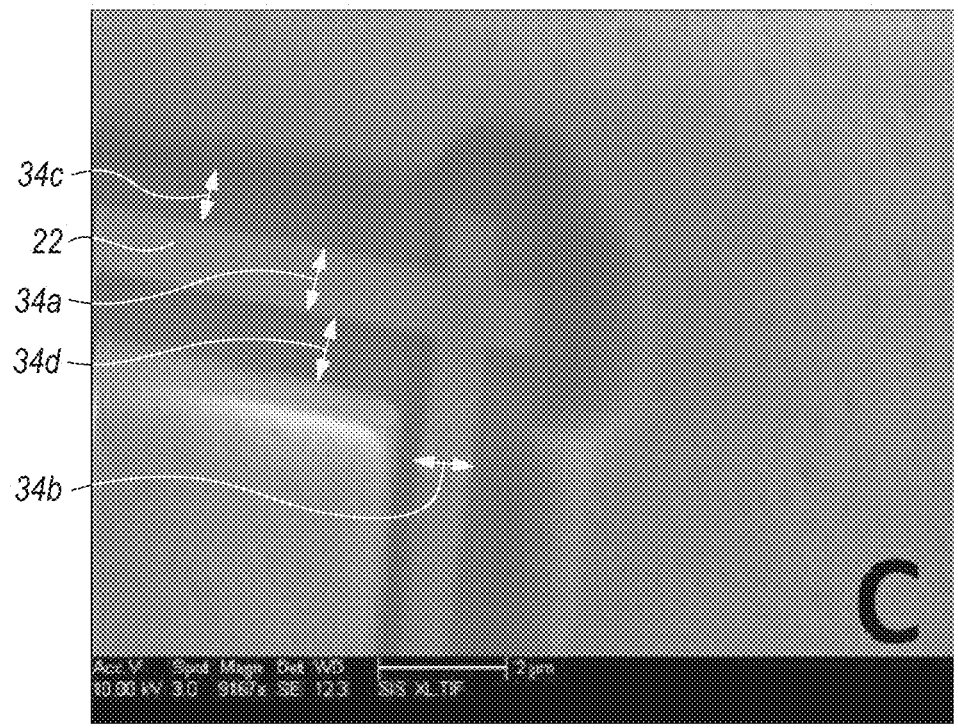
FIG. 3C is the same image as FIG. 3A, but with the patterned waveguide having a cross structural shape.
Figure 3D:
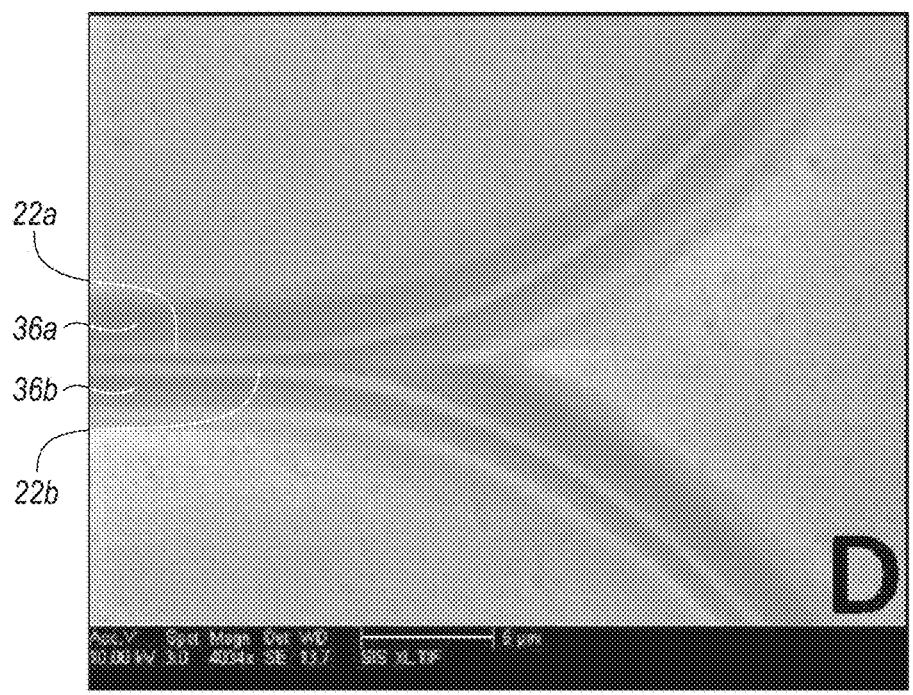
FIG. 3D is the same image as FIG. 3A, but with two patterned waveguides having a coupled configuration.

In FIG. 3C, a patterned waveguide depicting two crossed Si strip patterned waveguide 22 can be shown. The portion of patterned waveguide 22 depicted by arrow 34a can be 1020 nm wide, while the silicon strip shown by arrow 34b can be slightly narrower, and can have an 845 nm strip width. Arrow 34c can depict a gap between the horizontal Si strip portion of patterned waveguide 22 and under etched $SiO_2$, the gap can be 958 nm wide, while arrow 34d can represent the gap on the other side of the Si strip portion of patterned waveguide 22; it can be about 966 nm wide. FIG. 3D can show two patterned waveguides 22 that have actually been patterned in a coupled fashion. The patterned waveguides 22a and 22b can both be about 520 nm wide. Arrow 36a can point to a gap between the silicon waveguide of arrow 22a and under etched $SiO_2$. This gap can be 1100 nm wide. Arrow 36b can mark a 1050 nm wide gap between the silicon patterned waveguide denoted by 22b and under etched $SiO_2$.

Figure 4A:
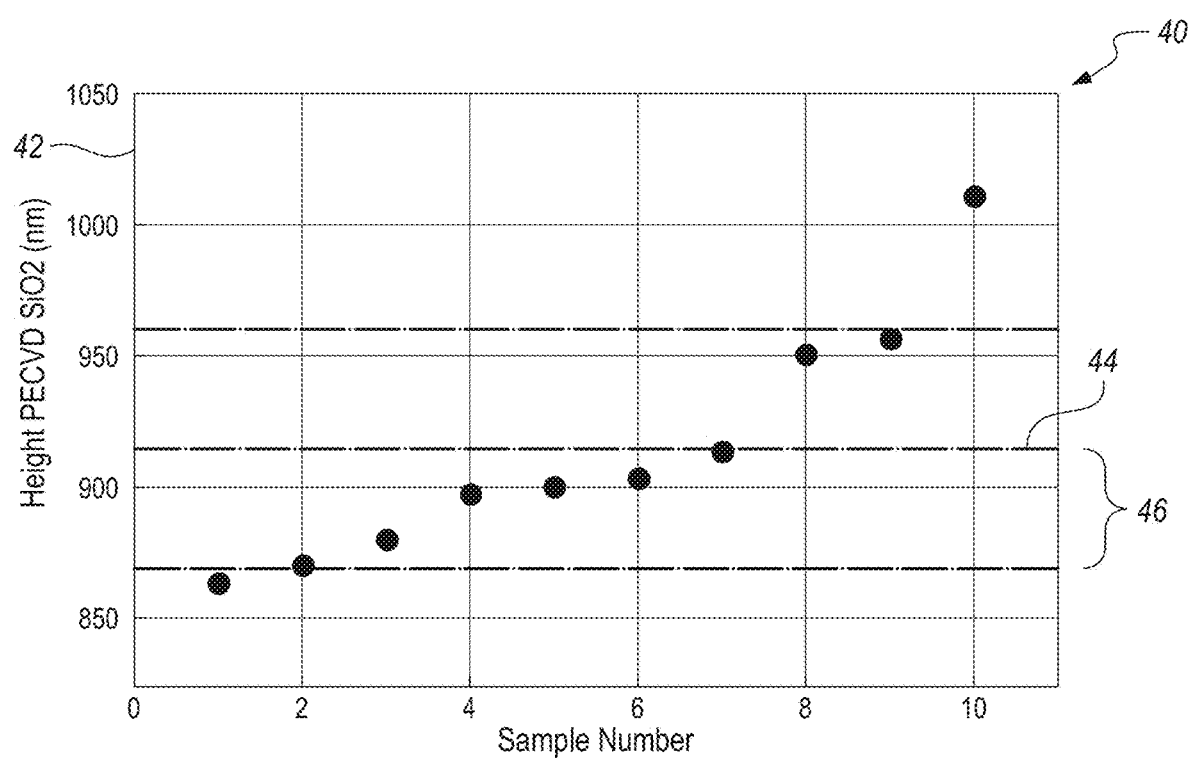
FIG. 4A is a graph of cladding height versus number of samples of optical waveguides that have been manufactured using invention methods.

From FIGS. 3A-3D, it can be seen that the lower density portions 26 of cladding 14 can extend out about 1 μm from each surface of the patterned waveguides 22, and the area of low(er) density of the cladding 14 can be independent of the patterned waveguide geometry. Further, the lower density, "uniform non-uniformity" effect can be consistently reproduced. To demonstrate this, and referring now to FIG. 4, FIG. 4 can be a graph 40 of the $SiO_2$ cladding thickness for ten samples that were made using the methods of the present invention according to several embodiments. The y-axis 42 can represent the height of the under etched $SiO_2$ layer (lower density portion 26) for 10 different optical waveguides 10 samples that were manufactured using the systems and methods of the present invention according to several embodiments. The data in graph 40 can be ordered from lowest to highest value. As shown in FIG. 4, the mean of the under etched layer is 914 nm (dotted line 44) and the standard deviation 46 can be 45 nm.

Figure 4B:
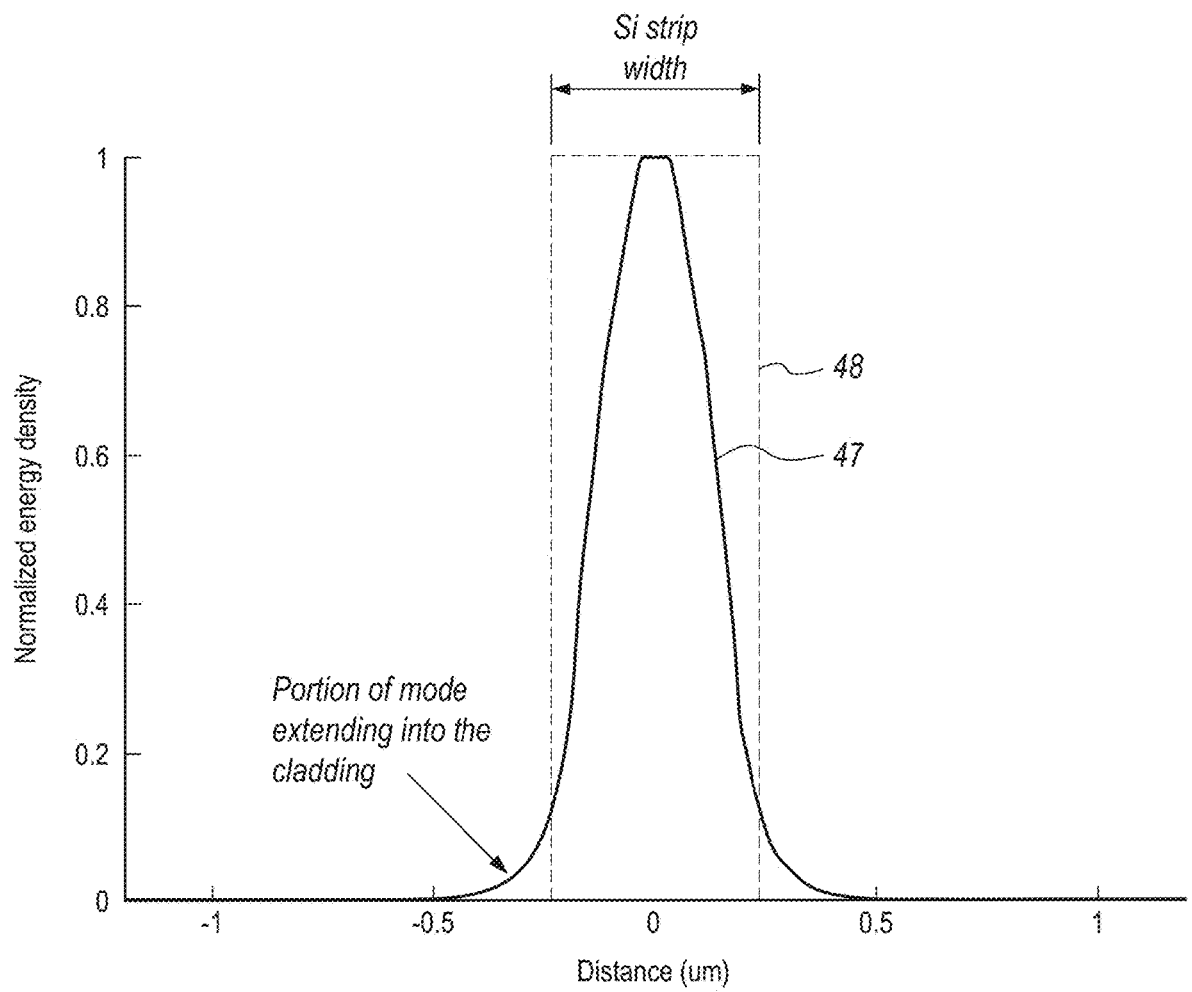
FIG. 4B is a graphs of normalized energy density versus distance from the waveguide centerline; and, FIG. 5 is a block diagram, which depicts steps that can be taken to accomplish some of the methods of the present invention according to several embodiments.

The above can mean that areas up to 1 μm away from the silicon patterned waveguides 22 were demonstrated to consist of the lower density $SiO_2$, but that is also sufficient for other photonic applications such as resonators, photonic crystals, plasmonic devices and the like. This can be advantageous because, in silicon waveguides of 300 nm width or greater, the mode seldom extends 1 μm beyond the core, and the region of photonic structures requiring the lower density oxide will typically be below 1 μm. For example, and referring to FIG. 4B, FIG. 4B is a graph of normalized energy density versus distance from the centerline of an optical waveguide. Box 47 in FIG. 47 can be representative of the waveguide 22 cross-section dimensions (roughly 500 nm in width, or 250 nm from the centerline) and curve 48 can represent the normalized energy density. From FIG. 4B, it can be seen that the optical waveguide and methods of the present invention according to several embodiments can result in almost the entire mode (area under the energy density curve 47) being within the waveguide 22. Stated differently, the optical signal can be "trapped" within the waveguide, which can result in very little light escaping the waveguide during transmission (optical losses), while employing the systems and methods of several embodiments.

In order to characterize the refractive index of the oxide, two samples were measured and the measurement results were input into a simulation model. The two samples each consisted of a 19.5 μm diameter ring patterned waveguide 22 shape, a, 500 nm wide and 250 nm tall silicon ring resonator. The difference between the two characterization samples was that the first sample was clad in air, and the second sample was clad in the low refractive index oxide fabricated following the PECVD steps according to several embodiments as described above. The measured ring resonator group indices were input into a 2-D COMSOL® Multiphysics finite-element model (provided by COMSOL AB Corporation, Stockholm Sweden, other mathematical models could be used) and used to calculate the refractive index of PECVD oxide surrounding the silicon waveguides.

The oxide refractive index surrounding the silicon structures for the patterned waveguide of the present invention was $n_{PECVD}=1.253$, which is considerably lower than the typical $SiO_2$ where an anticipated value of $n_{PECVD}=1.453$ (at 1550 nm) would be expected. The difference in refractive indices between a film of PECVD $SiO_2$ deposited on a planar surface and that of PECVD $SiO_2$ surrounding the silicon strip waveguides was $\Delta n=-0.2$. The density of the lower density portions 26 was $\rho_{SiO2}=1.27$ g/cm$^3$. Further, from Energy Dispersive X-ray Analysis (ED X) analysis, it can be demonstrated that the low index areas contained a decreased atomic concentration of Si, $C_{Si}<35.2\%$ and an increased atomic concentration of oxygen, $C_O>64.8\%$.

Figure 5:
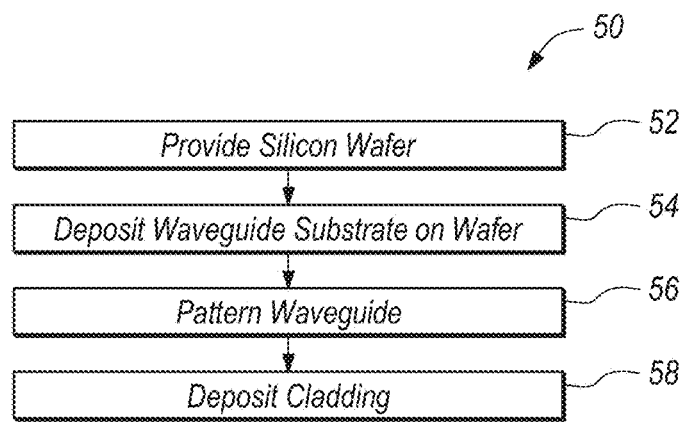

Referring now to FIG. 5 a block diagram 50 is shown, which can be used to represent the methods according to several embodiments. As shown, method 50 can include the step 52 of providing a silicon wafer 12. Block 54 can represent the step of depositing a waveguide substrate 20 on the wafer 12, while block 56 can depict the step of patterning the waveguide substrate 20 in a predetermined pattern to form the desired patterned waveguide 22. The methods can further include the step (as shown by block 58) of depositing a cladding using a PECVD process, so that the cladding has a "uniform non-uniformity" wherein the cladding 14 has a refractive index of less than 1.3 in the lower density portion 26 immediately proximate the patterned waveguide 22 (in a direction normal to the patterned waveguide 22 out to a distance of approximately 1 μm), while the remainder of the cladding has a uniform higher refractive index so that the refractive index difference between the lower density portion 26 and the remainder of the cladding is at least $\Delta n-0.2$. The PECVD process of step 58 can be accomplished as described above, although other PECVD processes and parameters could be used, provided the CVD process results in the cladding having the "uniform non-uniformities" described herein.

Some of the advantages of the waveguides and methods according to several embodiments can include a considerably lower refractive index (n=1.25) in the areas of the cladding 14 immediately (less than 1 μm) proximate patterned waveguide 22 than conventional SiO2 (n=1.46) or MgF2 (n=1.39) claddings. This can further result in an increased refractive index difference (greater than 0.2) between cladding 14 and lower density portions 26, which can still further result in increased light confinement (decreased optical losses) within patterned waveguide 22 and better light transmission therethrough.

Advantages can also include an increased mechanical stability for cladding 22 due to use of the PECVD process, rather than having to deposit $SiO_2$ at an angle. The waveguides and methods can allow for thicker layers to be grown (1 μm and thicker). This can be difficult to achieve with SiO2 deposited at an angle. Simple fabrication recipe, not requiring oblique-angle evaporation. The waveguides and methods can be fabricated with conventional CMOS equipment. No additional equipment is required. No modifications to existing equipment are required. The methods according to several embodiments can also avoid formation of porous structures such as arrays of nano-rods, and led to greater temperature stability and resistance than low-index fluoropolymers.

Other PECVD oxides may also be used, such as $SiO_x$, $SiN_x$ and $SiO_xN_y$. Other PECVD materials that can be used, such as SiC or Diamond-like carbon (DLC). Non-solid and non-conventional optical materials can also be used in combination with a fluidic chamber. Examples can include water (n=1.333), Ethyl Alcohol, slight dispersion (n=1.362), and Amyl Alcohol, slight dispersion (n=1.409).

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising the steps of:
   A) providing a wafer;
   B) depositing a waveguide substrate on said wafer;
   C) patterning said waveguide substrate to result in a waveguide; and,
   D) depositing a cladding on said waveguide,
   wherein said cladding has a first density portion and lower density portion, said lower density portion being in contact with said waveguide, said first density portion having a first density, said lower density portion having a lower density that is lower than the first density, said lower density portion having a uniform refractive index n of less than 1.3.

2. The method of claim 1, wherein said step A) is accomplished using a wafer selected from the group consisting of silicon, silicon on insulator (SOD, or silicon on sapphire (SOS).

3. The method of claim 1, wherein said waveguide substrate is silicon.

4. The method of claim 1, wherein said step D) is accomplished using a plasma enhanced chemical vapor deposition (PECVD) process.

5. The method of claim 4, wherein said waveguide is shaped such that a cross-section of said waveguide has an outer surface, and further wherein said step D) results in said uniforms refractive index out to a distance of one micrometer (1 μm) in a direction from and normal to said outer surface.

6. The method of claim 5, wherein said PECVD process results in a cladding thickness of about 1800 nanometers, when said wafer has a thickness of about 680 micrometers and said waveguide has a thickness of at least 250 nanometers.

7. The method of claim 1, wherein said step B) is accomplished using electron beam (e-beam) resist.

8. The method of claim 1, wherein said step B) is accomplished using photoresist.

9. A waveguide comprising:
   a wafer;
   a patterned waveguide on said wafer;
   a cladding deposited on said wafer and said waveguide; and,
   said cladding having a first density portion and lower density portion, said lower density portion being in contact with said waveguide, said first density portion having a first density, said lower density portion having a lower density that is lower than the first density, said lower density portion having a uniform refractive index n of less than 1.3.

10. The waveguide of claim 9, wherein said wafer is made of a material selected from the group consisting of silicon, silicon on insulator (SOI), or silicon on sapphire (SOS).

11. The waveguide of claim 10, wherein said waveguide is silicon.

12. The waveguide of claim 9, wherein said cladding is deposited using a plasma enhanced chemical vapor deposition (PECVD) process.

13. The waveguide of claim 12, wherein said waveguide is shaped such that a cross-section of said waveguide has an outer surface, and further wherein said PECVD process results in a uniform cladding out to a distance of one micrometer (1 μm) in a direction from and normal to said outer surface.

14. The waveguide of claim 12, wherein said PECVD process results in a cladding of about 1800 nanometers, when said wafer is 680 micrometers and said waveguide is at least 250 nanometers.

15. The waveguide of claim 9, wherein said waveguide is patterned using electron beam (e-beam) resist.

16. The waveguide of claim 9, wherein said waveguide is patterned using photoresist.

17. A method for improving transmission of an optical signal from an optical waveguide, said method comprising the steps of:
   A) selecting a waveguide have a waveguide refractive index, said optical signal being transmitted through said waveguide; and,
   B) confining said optical signal within said waveguide, said confining step being accomplished by cladding said waveguide with a material,
   wherein said material has a first density portion and lower density portion, said lower density portion being in contact with said waveguide, said first density portion having a first density, said lower density portion having a lower density that is lower than the first density, said lower density portion having a uniform refractive index n of less than 1.3.

18. The method of claim 17, wherein said cladding is deposited on said waveguide using plasma enhanced chemical vapor deposition (PECVD).

19. The method of claim 18, wherein said waveguides have surfaces, and said cladding refractive index is uniform out to one micrometer from said waveguide surfaces.

20. The method of claim 19, wherein said waveguide is silicon.

* * * * *